US009310817B2

(12) United States Patent
Pude

(10) Patent No.: US 9,310,817 B2
(45) Date of Patent: Apr. 12, 2016

(54) NEGATIVE VOLTAGE FEEDBACK GENERATOR

(71) Applicant: Synaptics Incorporated, San Jose, CA (US)

(72) Inventor: Mark Pude, Victor, NY (US)

(73) Assignee: SYNAPTICS INCORPORATED, San Jose, CA (US)

(*) Notice: Subject to any disclaimer, the term of this patent is extended or adjusted under 35 U.S.C. 154(b) by 45 days.

(21) Appl. No.: 14/231,108

(22) Filed: Mar. 31, 2014

(65) Prior Publication Data
US 2015/0220093 A1  Aug. 6, 2015

Related U.S. Application Data

(60) Provisional application No. 61/935,732, filed on Feb. 4, 2014.

(51) Int. Cl.
G05F 1/56 (2006.01)
G05F 1/565 (2006.01)
G05F 1/575 (2006.01)
G05F 3/30 (2006.01)
H02M 3/07 (2006.01)

(52) U.S. Cl.
CPC .............. *G05F 1/565* (2013.01); *G05F 1/575* (2013.01); *G05F 3/30* (2013.01); *H02M 3/07* (2013.01)

(58) Field of Classification Search
CPC ............ G05F 1/56; G05F 1/561; G05F 1/575
USPC ....................................................... 327/103
See application file for complete search history.

(56) References Cited

U.S. PATENT DOCUMENTS

| 3,835,410 | A  | * | 9/1974  | Wittlinger ...................... 330/288 |
| 4,686,487 | A  | * | 8/1987  | Radovsky ...................... 330/288 |
| 4,717,869 | A  | * | 1/1988  | Koch ....................... G05F 1/561 |
|           |    |   |         | 323/316 |
| 4,872,100 | A  |   | 10/1989 | Diaz |
| 4,928,056 | A  | * | 5/1990  | Pease ............................ 323/314 |
| 5,917,368 | A  | * | 6/1999  | Tan et al. ...................... 327/543 |
| 6,462,527 | B1 | * | 10/2002 | Maneatis ....................... 323/315 |
| 6,703,900 | B2 | * | 3/2004  | Ivanov et al. .................. 330/255 |
| 6,724,233 | B1 | * | 4/2004  | Wittlinger ..................... 327/354 |
| 7,102,342 | B2 | * | 9/2006  | Kim .............................. 323/316 |
| 7,944,281 | B2 | * | 5/2011  | Yu .............................. G05F 3/24 |
|           |    |   |         | 323/312 |
| 8,283,969 | B2 | * | 10/2012 | Okamoto ............. H03H 11/245 |
|           |    |   |         | 327/536 |
| 8,988,154 | B2 | * | 3/2015  | Zhang ............................. 331/57 |
| 2001/0033152 | A1 |   | 10/2001 | Pohlman et al. |
| 2004/0155638 | A1 |   | 8/2004  | Flaherty |
| 2005/0259448 | A1 |   | 11/2005 | Koike |
| 2007/0019450 | A1 |   | 1/2007  | Tiew et al. |

(Continued)

Primary Examiner — Thomas J Hiltunen
(74) Attorney, Agent, or Firm — Patterson + Sheridan, LLP

(57) ABSTRACT

Embodiments of the invention generally provide an device that regulates a negative output voltage from a power supply using a positive representation of the negative output voltage. To convert the negative voltage to a positive voltage, the device changes the negative voltage into a current using, for example, a current generator that outputs a current corresponding to the negative voltage received from the power supply. This current is then transferred from the negative voltage domain to the positive voltage domain and is fed through a voltage generator that outputs a positive voltage corresponding to the current. By doing so, the negative voltage output is transformed into a corresponding positive voltage. This positive voltage may then be compared to a positive reference voltage to determine an error signal for adjusting the power supply.

20 Claims, 6 Drawing Sheets

(56) References Cited

U.S. PATENT DOCUMENTS

| | | |
|---|---|---|
| 2008/0157732 A1 | 7/2008 | Williams |
| 2008/0266916 A1* | 10/2008 | Yen et al. .................. 363/74 |
| 2008/0297129 A1 | 12/2008 | Nagasaki et al. |
| 2009/0039711 A1 | 2/2009 | Williams |
| 2009/0319210 A1 | 12/2009 | Yanagisawa |
| 2012/0049830 A1 | 3/2012 | Watanabe |
| 2012/0182251 A1* | 7/2012 | Krah ............................. 345/174 |
| 2013/0027985 A1 | 1/2013 | Wang et al. |
| 2013/0250631 A1* | 9/2013 | Liao et al. ...................... 363/44 |

* cited by examiner

US 9,310,817 B2

NEGATIVE VOLTAGE FEEDBACK GENERATOR

CROSS-REFERENCE TO RELATED APPLICATIONS

This application claims benefit of U.S. provisional patent application Ser. No. 61/935,732, filed Feb. 4, 2014 entitled "Negative Voltage Feedback Generator", which is herein incorporated by reference.

BACKGROUND OF THE INVENTION

1. Field of the Invention

Embodiments of the present invention generally relate to regulating negative voltages from a power supply, and more specifically, to transferring a negative output voltage to a positive voltage when performing voltage regulation.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

One embodiment described herein is a voltage conversion circuit that includes a voltage-to-current converter configured to receive a negative voltage in a negative domain as an input and output a current based on a difference between the negative voltage and a constant reference voltage. The voltage conversion circuit includes a converter configured to receive the output current from the voltage-to-current converter and convert the output current in the negative domain to a transferred current in a positive domain. The voltage conversion circuit also includes a current-to-voltage converter configured to generate a positive voltage in the positive domain that corresponds to the transferred current.

Another embodiment described herein is a method that converts a received negative voltage in a negative domain into a corresponding current based on a difference between the negative voltage and a constant reference voltage. The method also converts the corresponding current in the negative domain to a transferred current in a positive domain. The method generates a positive voltage in the positive domain that corresponds to the transferred current.

Another embodiment described herein is a processing system that includes a voltage-to-current converter configured to receive a negative voltage in a negative domain as an input and output a current based on a difference between the negative voltage and a constant reference voltage. The processing system also includes a converter configured to receive the output current from the voltage-to-current converter and convert the output current in the negative domain to a transferred current in a positive domain. The processing system includes a current-to-voltage converter configured to generate a positive voltage in the positive domain that corresponds to the transferred current and an error compensator coupled to an output of the current-to-voltage converter to receive the positive voltage, the error compensator is configured to compare the positive voltage to a positive reference voltage to regulate a supply voltage in the processing system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
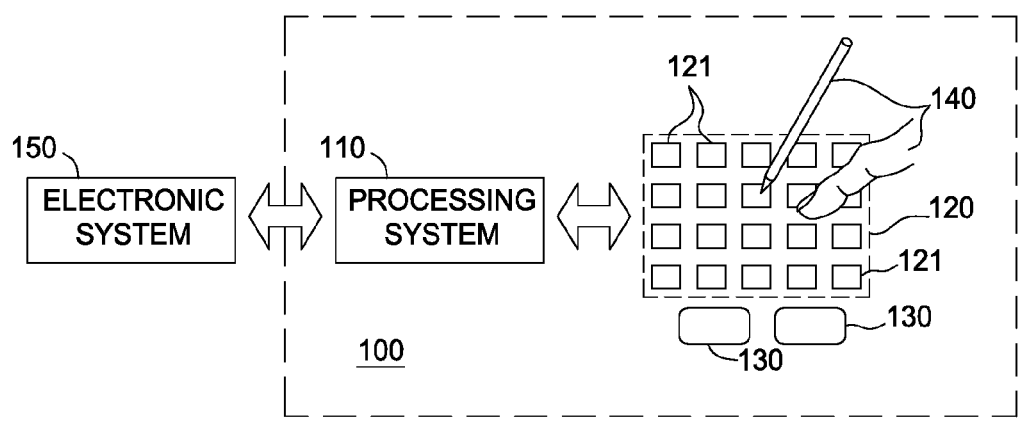
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. For example, many input devices include power supplies that provide power to other circuits. These circuits may be located on a same substrate (e.g., integrated circuit) as the power supply or located on separate substrates. The input devices may also include voltage regulation systems that monitor the output of the power supplies and adjust the output using a feedback loop. For instance, positive voltage regulation may be achieved by comparing the positive output voltage from the power supply to a positive reference voltage. Performing negative voltage regulation, however, is more complicated. For example, regulating a negative output voltage from a power supply entails using either a negative reference voltage or a positive representation of the negative output voltage. Because a negative reference voltage may not be readily available, the embodiments provided below describe performing negative voltage regulation by converting the negative output voltage from the negative voltage domain to the positive voltage domain. Once this is done, the now positive voltage can be compared with a positive reference voltage as is done with positive voltage regulation.

In one embodiment, the negative output voltage from a power supply is fed into a negative voltage converter which converts the negative voltage into a positive voltage. To do so, the converter includes a current generator that outputs a current corresponding to the negative voltage received from the power supply. This current is then transferred from the negative voltage domain to the positive voltage domain. In one embodiment, the current (which is now in the positive domain) is attenuated using a programmable current mirror. The scaled current is then fed through a voltage generator which outputs the positive voltage. In this manner, the negative output voltage is transformed into a corresponding positive voltage. This positive voltage may then be compared to a positive reference voltage to determine an error signal factor for adjusting the power supply.

By converting the negative voltage into a corresponding positive voltage, the input device avoids having to generate a negative reference voltage in order to perform voltage regulation. Generating the negative reference voltage may require an amplifier that spans the positive and negative voltage domains as well as resistive feedback which is typically used to convert a positive voltage reference into a negative reference voltage. By avoiding these circuit elements, the input device may save power and prevent introducing an error into the positive voltage reference.

FIG. 1 is a block diagram of an exemplary input device 100, according to one embodiment presented herein. Although embodiments of the present disclosure may be utilized in an input device 100 including a display device integrated with a sensing device, it is contemplated that the invention may be embodied in display devices without integrated sensing devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, behind, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive. Although not shown, the sensing elements 121 may be capacitive sensing pixels that include one or more sensor or other electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. The change in capacitive coupling may be between sensor electrodes in two different sensing elements 121 or between two different sensor electrodes in the same sensing element 121. In various embodiments, an input object near the sensor electrodes alters the electric field between the sensor electrodes, thus changing the measured capacitive coupling. In one implementation, a transcapacitance sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In one embodiment, the sensing elements 121 comprise one or more electrodes that are arranged as transmitter and receiver electrodes that at least partially overlap in, for example, mesh pattern. In one embodiment, both the transmitter electrodes and the receiver electrodes 170 are both disposed within a display stack on the display screen substrate. Additionally, at least one of the transmitter and/or receiver electrodes in the display stack may comprise a combination electrode that is used for both capacitive sensing and updating the display. However, in other embodiments, only the transmitter electrodes or only the receiver electrodes (but not both) are disposed within the display stack while other sensor electrodes are outside of the display stack (e.g., disposed on an opposite side of a color filter glass).

In another embodiment, the sensing elements 121 comprises one or sensor electrodes arranged in a matrix array. In one embodiment, all of the sensor electrodes in the matrix array are disposed in a display stack on the display screen substrate. Furthermore, at least one of the sensor electrodes in the display stack may be a combination electrode. However, in other embodiments, only a portion of the sensor electrodes are disposed within the display stack while other sensor electrodes are outside of the display stack (e.g., disposed on an opposite side of a color filter glass).

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), electrowetting, MEMS, or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
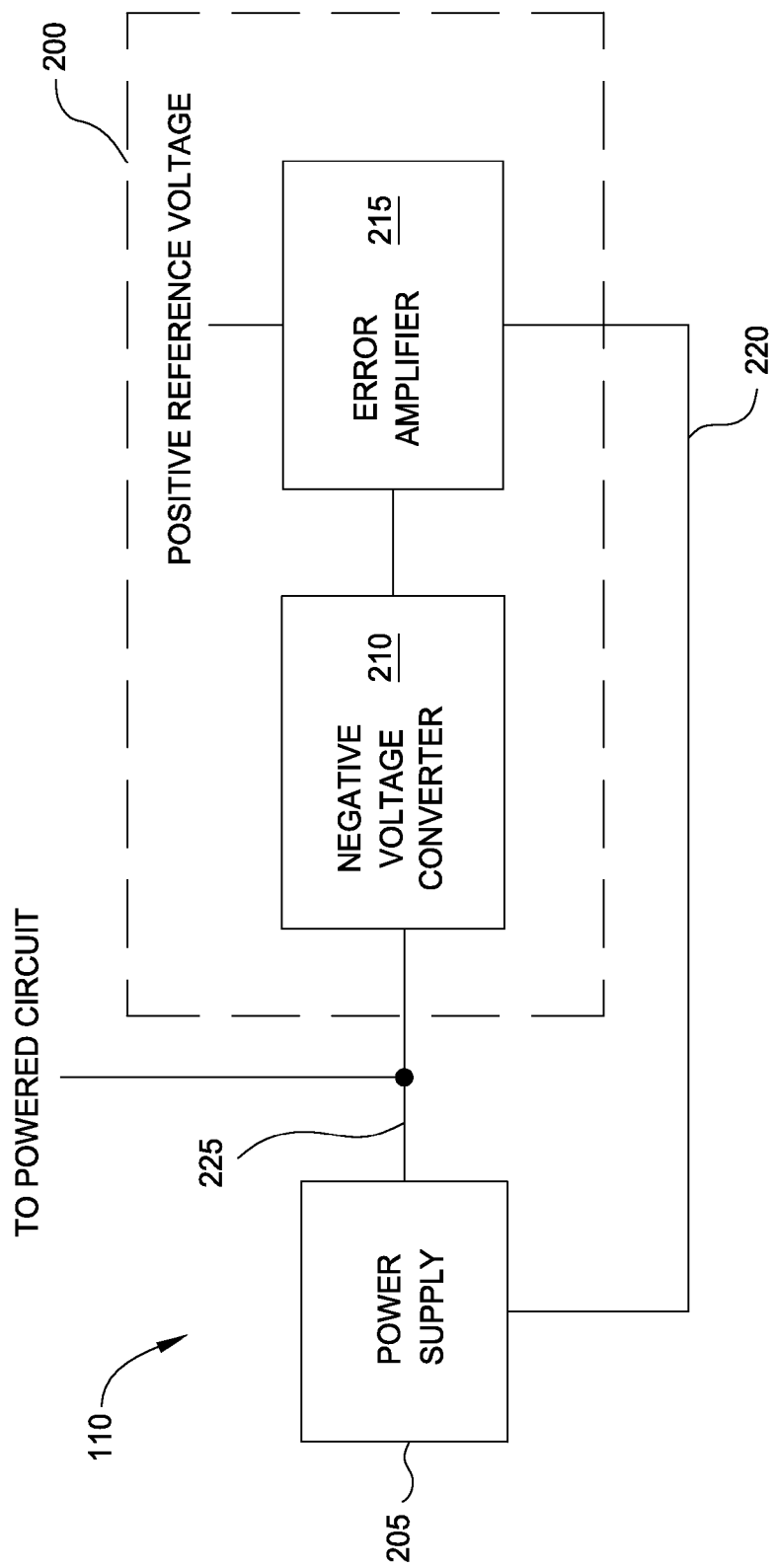
FIG. 2 illustrates a processing system that performs negative voltage regulation, according to one embodiment described herein.

FIG. 2 illustrates a processing system 110 that performs negative voltage regulation, according to one embodiment described herein. In one embodiment, the processing system 110 shown in FIG. 2 may be a processing system 110 described above in FIG. 1. The processing system 110 includes a power supply 205 and a corresponding voltage regulation system 200. However, the processing system 110 may include any number of power supplies 205 which each may have a respective voltage regulation system 200. An output 225 of the power supply 205 may be used to power one or more electrical circuits (not shown). These powered electrical circuits may be internal to the processing system 110 or external to the processing system 110. For the embodiments that follow, it is assumed that the power supply 205 outputs a negative voltage which may be, for example, used in a display to drive negative voltages onto pixels or to provide negative voltage rails for an amplifier.

Because varying loads or changing environmental conditions may alter the output 225, processing system 110 includes the voltage regulation system 200 to identify an error between the current output voltage of the power supply 205 and its desired output voltage. The regulation system 200 then provides an error signal via the feedback loop 220 for minimizing the identified error. That is, the regulation system 200 adjusts the current output of the power supply 205 such that it matches the desired output voltage.

The voltage regulation system 200 includes a negative voltage converter 210 and an error amplifier 215. The negative voltage converter 210 is coupled to the output 225 of the power supply 205. As will be described in more detail below, the converter 210 converts the negative voltage from the power supply 205 into a corresponding positive voltage. As such, the remaining portion of the voltage regulation system 200 may be configured to regulate a positive voltage rather than a negative voltage. Specifically, the positive voltage generated by the converter 210 is fed into the error amplifier 215 which uses a positive reference voltage (e.g., a bandgap voltage) to determine the error signal for adjusting the output voltage of the power supply 205. This disclosure, however, is not dependent on any particular error amplifier 215 design or configuration. As such, the negative voltage converter 205 may be used with any suitable positive voltage regulation system for controlling the output voltage of the power supply 205 in the voltage regulation system 200. As described above, by including the negative voltage converter 210, the voltage regulation can use the positive reference voltage for determining the error signal rather than generating a negative reference voltage.

As described above, in one embodiment, the processing system 110 includes one or more integrated circuits. For instance, the power supply 205 and voltage regulation system 200 may be located on the same integrated circuit. Alternatively, the power supply 205 and the elements in the regulation system 200 may be located on different integrated circuits. Further still, the power supply 205 and the voltage regulation system 200 may be located on one integrated circuit while other components in the processing system 110 (e.g., display or capacitive sensing modules) are located on one or more different integrated circuits.

Figure 3:
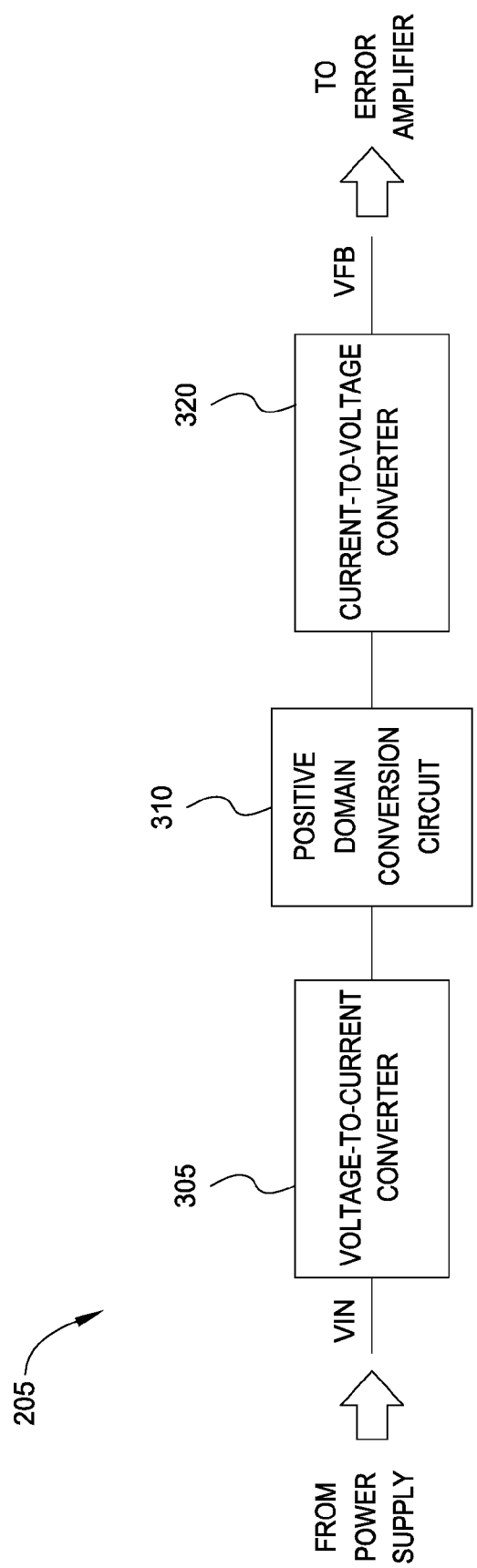
FIG. 3 illustrates a block diagram of a negative voltage converter used when performing negative voltage regulation, according to one embodiment described herein.

FIG. 3 illustrates a block diagram of a negative voltage converter 205 used when performing negative voltage regulation, according to one embodiment described herein. Specifically, FIG. 3 illustrates a more detailed illustration of the negative voltage converter 205 introduced in FIG. 2. As shown, the converter 205 includes a voltage-to-current converter 305 (referred to herein as "V-C converter"), a positive domain conversion circuit 310, and a current-to-voltage converter 320 (referred to herein as "C-V converter"). The negative voltage provided by the power supply (i.e., $V_{IN}$) is fed into the V-C converter 305 which converts the negative voltage into a corresponding current. This current is then converted from the negative voltage domain to a positive voltage domain by the conversion circuit 310. As used herein, the positive voltage domain includes all of the voltages above ground reference (or zero volts), while the negative voltage includes the voltage below the ground reference. The ground reference can be considers as part of the positive voltage domain and/or part of the negative voltage domain.

In one embodiment, the current converted from the negative voltage domain to the positive voltage domain is scaled. More specifically, by attenuating the current, the transfer function of the negative voltage converter 205 is linear which may result in a less complicated scheme for regulating the output voltage. The advantageous of a linear transfer function will be described in more detail below.

The scaled current is fed into the C-V converter 320 which outputs a corresponding positive voltage ($V_{FB}$). This positive voltage is then used by the error amplifier for generating an error signal for adjusting the output voltage of the power supply—e.g., adjusting $V_{IN}$. Thus, by converting the negative voltage into a current which is then transferred into the positive domain, the negative voltage converter 205 outputs a positive voltage than can be compared to a positive reference voltage rather than a negative reference voltage.

Figure 4:
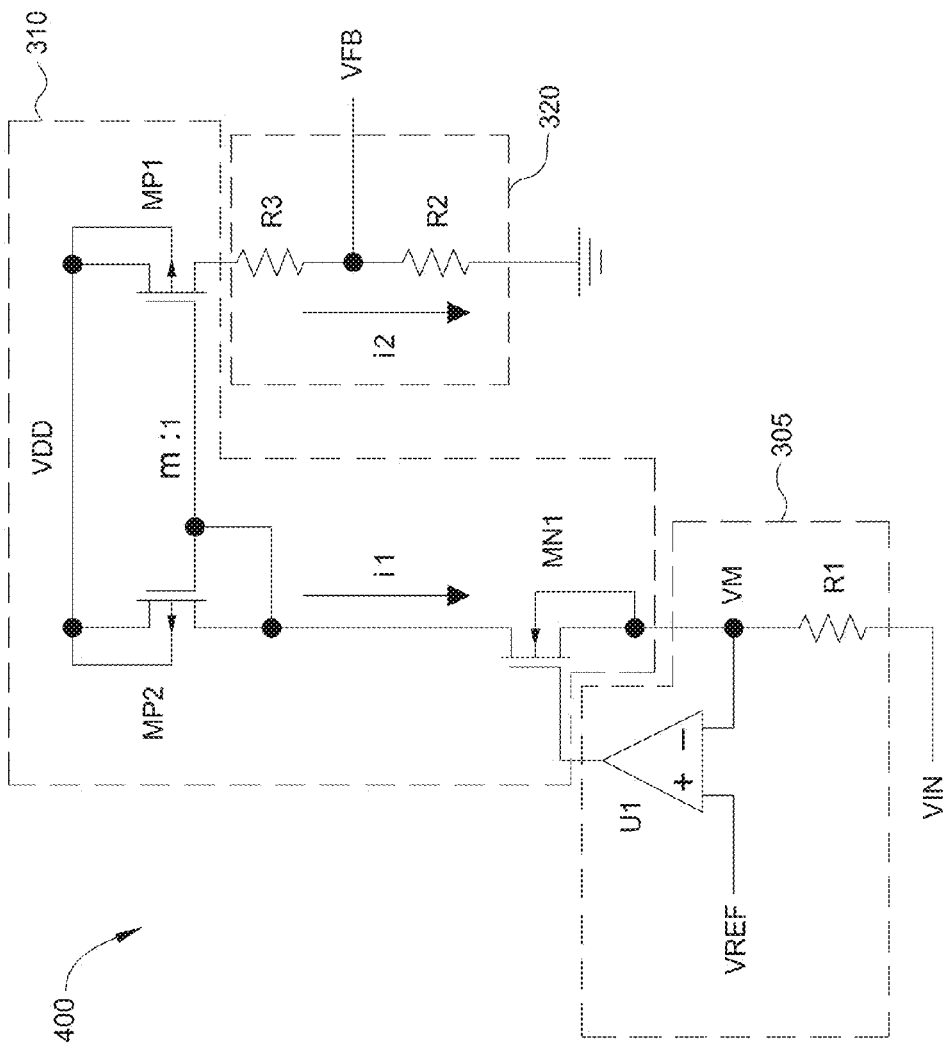
FIG. 4 illustrates a circuit diagram of the negative voltage converter, according to one embodiment described herein.

FIG. 4 illustrates a circuit diagram 400 of the negative voltage converter, according to one embodiment described herein. The circuit diagram 400 illustrates the various electrical components that make up the V-C converter 305, positive domain conversion circuit 310, and the C-V converter 320 described above. First, the negative output voltage of a power supply ($V_{IN}$) is supplied to the V-C converter 305. To generate a corresponding current, the V-C converter 305 includes an amplifier U1 with an input $V_{REF}$. $V_{REF}$ can be any known (e.g., fixed) voltage. The amplifier U1 and transistor MN1, which is in the feedback loop of amplifier U1, work together to drive the voltage $V_M$ to the same value as the $V_{REF}$. That is, the V-C converter 305 fixes the voltage $V_M$ to the same value as $V_{REF}$. Thus, the current i1 is determined by the difference between $V_M$ (i.e., $V_{REF}$) and $V_{IN}$. Because $V_M$ remains fixed, the current i1 changes only when $V_{IN}$ various. Stated differently, current i1 is a function only of $V_{IN}$. The value of current i1 is expressed using Ohm's law as:

$$i1 = \frac{V_M - V_{IN}}{R1} = \frac{V_{REF} - V_{IN}}{R1} \quad (1)$$

In this manner, the V-C converter 305 generates a current i1 that is a function of the negative power supply voltage $V_{IN}$.

The current i1 is then transferred from the negative voltage domain to the positive voltage domain using the positive domain conversion circuit 310. This conversion takes place by virtue of the transistor MN1 conducting the current i1 between its drain and source. That is, the current at the source of transistor MN1 (e.g., the portion of the transistor MN1 coupled to $V_M$) is in the negative voltage domain but the current at the drain of MN1 is in the positive voltage domain. Thus, by conducting the current i1 through the drain and source of transistor MN1, the conversion circuit 310 transfers the current i1 from the negative voltage domain to the positive voltage domain. Moreover, although transistor MN1 is shown as being part of the positive domain conversion circuit 310, because this transistor is also used when generating the current i1 from $V_M$, transistor MN1 may also be considered as part of the V-C converter 305.

In addition to transistor MN1, the positive domain conversion circuit 310 includes transistors MP2 and MP1 that are arranged to form a current mirror. The shared voltage at the gates of MP2 and MP1 is determined by the current outputted by the V-C converter 305 (i.e., current i1). The scaling factor m indicates how the output of the current mirror—i.e., current i2—is related to the input of the current mirror—i.e., current i1. If m is a positive integer greater than 1, then the output current i2 is attenuated relative to the input current i1. However, attenuating the input current i1 is not a requirement. In other embodiments, the current mirror may output a current i2 that is substantially equal to i1 or has a gain relative to i1. Assuming that the current mirror attenuates the current i1, the relationship between the output current i2 to the input current i1 is expressed as:

$$i2 = \frac{i1}{m} = \frac{V_{REF} - V_{IN}}{m \cdot R1} \quad (2)$$

The current i2 is then fed into the C-V converter 320 which includes resistors R3 and R2. Because one side of R2 is coupled to ground, the current i2 generates the voltage $V_{FB}$ as expressed by:

$$V_{FB} = i2 \cdot R2 = (V_{REF} - V_{IN}) \frac{R2}{m \cdot R1} \quad (3)$$

As shown by Equation 3, the value of $V_{FB}$ is based on the value of $V_{REF}$, R2, R1, the scaling factor m of the current mirror, and $V_{IN}$. Assuming the values of $V_{REF}$, R2, R1, and the scaling factor m are known (i.e., fixed), the value of $V_{FB}$ varies based solely on the value of $V_{IN}$. The relationship in Equation 3 can be further simplified if the value of $V_{REF}$ is set to zero—e.g., ground. Doing so also means that later circuits in the voltage regulation system do not have to compensate for the value of $V_{REF}$ when generating the error signal for the power supply. When $V_{REF}=0$, the transfer function, and ultimately the feedback factor of the circuit 400, is expressed as:

$$\beta = \frac{V_{FB}}{V_{IN}} = -\frac{R2}{m \cdot R1} \quad (4)$$

In Equation 4, the relationship between the input and output voltages of the negative voltage converter shown in diagram 400 is based on a ratio of the resistors R1 and R2 as well as the scaling factor m. Because $V_{REF}$ is held at zero, this value is absent from the transfer function β and avoids the scenario where later circuits must compensate for its effect on $V_{FB}$.

However, one possible challenge for implementing the circuit 400 when $V_{REF}$ is zero is the design of the amplifier U1. Because the value of $V_{REF}$ should be within the input common mode range of the amplifier U1, if $V_{REF}$ is set to zero, the amplifiers U1 uses positive and negative voltage rails in order to force $V_M$ to the same value as $V_{REF}$ (i.e., ground). Stated differently, when $V_{REF}$ is 0V, the amplifier U1 straddles the positive and negative voltage domains. However, if $V_{REF}$ is either a negative or positive voltage, then the amplifier U1 can be designed to function within only one of these domains. As will be described later in FIG. 5, an alternative embodiment may be used to avoid the complications associated with amplifier U1 when $V_{REF}$ is set to zero. Moreover, the present disclosure is not limited to using ground as the value of $V_{REF}$. Indeed, circuit 400 illustrates that any known voltage may be used as the input to amplifier U1 in order to perform the voltage conversion described above. For instance, if $V_{REF}$=1V, designing the amplifier U1 becomes an easier tasks since, for example, only a 5V rail and a 0V rail may be needed—i.e., the amplifier U1 is used only in the positive voltage domain.

In one embodiment, the ratio between MP1 and MP2 in the current mirror (i.e., the scaling factor m) is programmable allowing for a tunable output voltage relationship. As a result, circuit 400 may be used when regulating different power supplies that output different voltages. State differently, the circuit 400 may be attached to the output different power supplies that each supply different negative voltages. Each of the circuits 400 may then be configured, by changing the programmable scaling factor m, for the specific output voltage of the power supply. Thus, a copy of circuit 400 may be provided for each negative power supply in the processing system. Each of these copies are then programmed for the specific output of the power supply to which the circuit 400 is coupled (e.g., −4V, −3.5V, −1V, etc.).

As mentioned above, attenuating the current i1 using the scaling factor m results in a linear transfer function. The implementation of a linear transfer function to regulate the output voltage of a power supply ($V_{IN}$) may be expressed as:

$$V_{IN} = V_{BASE} + \text{Code} \cdot V_{STEP} \tag{5}$$

$$\text{where } V_{STEP} = V_{PosRef} \frac{R1}{R2} \tag{6}$$

$$\text{and } V_{BASE} = V_{PosRef} \frac{m_0 \cdot R1}{R2} \tag{7}$$

In Equation 5, "Code" is a digital code that can be selected by the error amplifier in the voltage regulation system to change the output voltage of the power supply ($V_{IN}$). Furthermore, $V_{PosRef}$ is the positive reference voltage (e.g., a bandgap voltage) used by the voltage regulation system to determine the error signal (e.g., the digital code) for adjusting the output voltage of the power supply and $m_0$ is ratio between MP1 and MP2 in the current mirror with a digital code of zero. Specifically, Equations 6 and 7 can be found by solving for $V_{IN}$ in Equation 3 such that $$V_{IN} = V_{PosRef} \cdot m \cdot \frac{R1}{R2} \tag{8}$$

To make this digitally controllable, m is varied and can be defined as $$m = m_0 + \text{Code} \cdot \Delta m \tag{9}$$

where "Code" is any integer and $\Delta m$ is the change in the m factor for every step in Code. Substituting Equation 9 into Equation 8 yields $$V_{IN} = V_{posRef} \cdot (m_0 + \text{Code} \cdot \Delta m) \cdot \frac{R1}{R2} \tag{10}$$

If we assume $\Delta m=1$—i.e., one device finger is added to MP2 every time the Code is incremented—then Equation 10 simplifies to $$V_{IN} = V_{posRef} \cdot (m_0 + \text{Code}) \cdot \frac{R1}{R2} \tag{11}$$

Because $V_{BASE}$ is when Code=0 (i.e., the zero base code), Equation 11 simplifies to Equation 7 above. Moreover, because $V_{STEP}$ is the change in voltage between adjacent steps in the Code, Equation 11 is simplified to yield Equation 6. Combining Equation 6 and Equation 7 results in Equation 5.

If, however, the current mirror provides a gain rather than attenuating current I1, the transfer function would be non-linear and $m_0$ would be in the denominator of Equation 7 rather than in the numerator. As a result, $V_{BASE}$ would no longer be linear with $m_0$ and the relationship in Equation 5 could not be used to adjust $V_{IN}$. Nonetheless, a linear transfer function is optional and the circuit 400 may be still be used to regulate a negative voltage even when circuit 400 has a non-linear transfer function.

In one embodiment, resistor R3 is used to limit the channel length modulation effect on MP1 in order to have currents i1 and i2 match more closely. For instance, the value of R3 may be selected to maintain MP1 in the saturation region. In another embodiment, however, the resistor R3 may be removed from circuit 400. For example, if the channel length of MP1 is correctly sized to keep it within the saturation region, then resistor R3 may be omitted.

In one embodiment, the circuit 400 permits the voltage regulation system to regulate voltages well outside the supported device voltage. That is, the circuit 400 can regulate voltages that exceed the rating or recommended operating voltages of some low-voltage circuit elements. The amplifier U1 and transistor MN1 serve as electrical buffers or shields to prevent damaging voltage magnitudes from reaching the terminals of the low-voltage circuit elements. For example, the low-voltage circuit elements such as MP1 and MP2 may be rated for voltages between 0 and 5V but the circuit 400 can receive an input voltage from a power supply as large as −20V without damaging these circuit elements. That is, the low-voltage circuits never see voltages that exceed their ratings.

Figure 5:
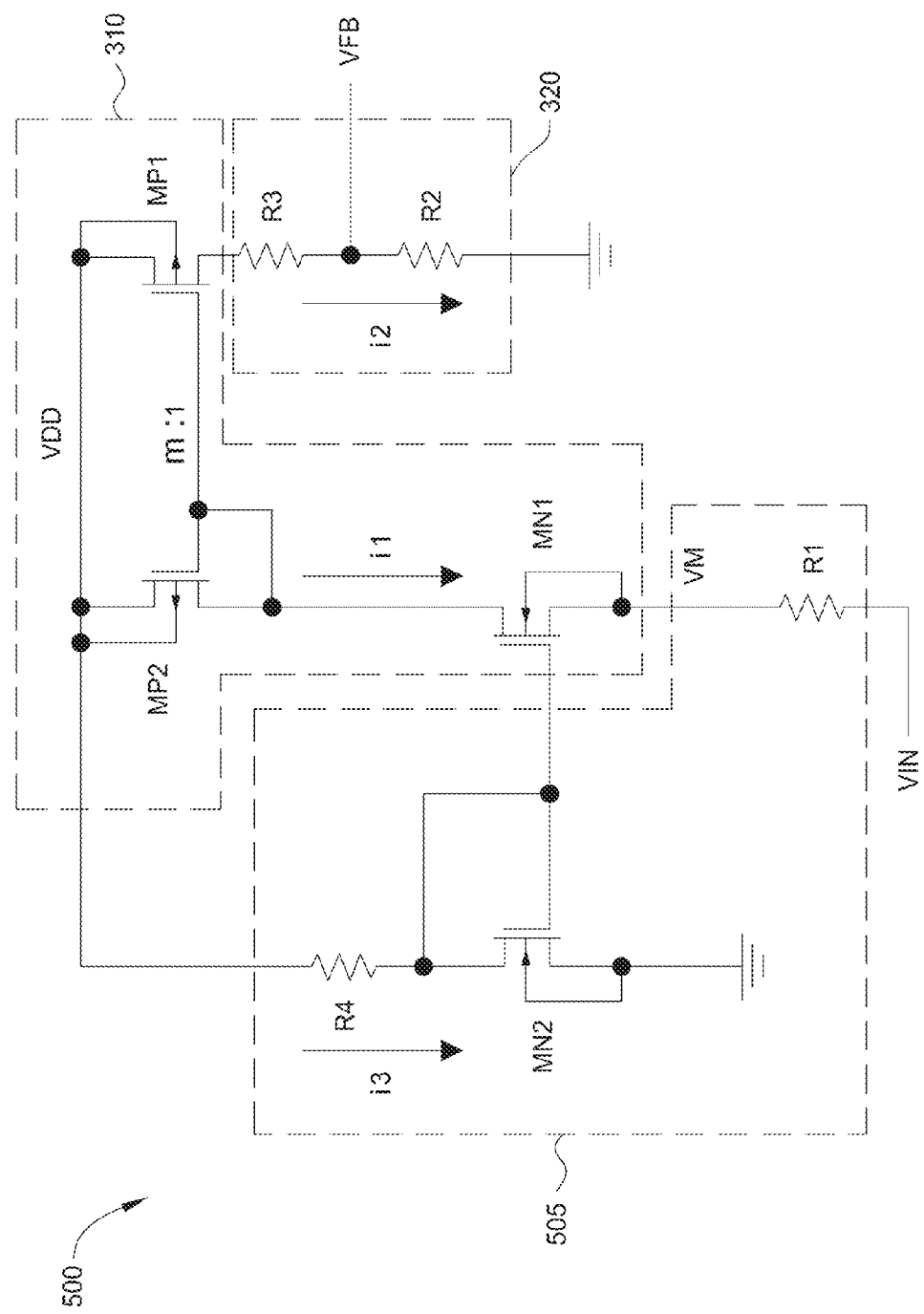
FIG. 5 illustrates a circuit diagram of the negative voltage converter, according to one embodiment described herein.

FIG. 5 illustrates a circuit diagram 500 of the negative voltage converter, according to one embodiment described herein. Specifically, the circuit diagram 500 illustrates an alternative design where $V_{REF}$ equals zero and the amplifier U1 shown in FIG. 4 (and its associated design complications) is avoided. Although the circuit diagram 400 in FIG. 4 can be used when $V_{REF}$ is set to zero, circuit diagram 500 illustrates a negative voltage converter that may be simpler to design and implement during this special condition.

Because the positive domain conversion circuit 310 and C-V converter 320 in circuit diagram 500 may be the same as the corresponding ones discussed in FIG. 4, these circuits will not be described in detail here. However, circuit 500 includes a different C-V converter 505 than the C-V converter 305 shown in FIG. 4. The C-V converter 505 in FIG. 5 includes transistor MN2 which forms a current mirror with transistor MN1. As mentioned previously, although transistor MN1 is shown as part of the positive domain conversion circuit 310, because this transistor also has a role in converting $V_{IN}$ into current i1, transistor MN1 may be considered as part of the C-V converter 505.

In one embodiment, the channels and/or lengths of the transistors MN2 and MN1 are sized to result in the current i1 where $V_M$ is set at 0V. That is, because desired value of $V_{IN}$ is known, the relationship between MN2 and MN1 can be set to provide the current i1 needed to drive $V_M$ to zero. For example, the dimensions of the transistors MN1 and MN2 can be the same or some integer multiple thereof. In either case, the dimensions of the transistors MN1 and MN2 may be set to provide the desired value of current i1 which causes $V_M$ to be at ground—i.e., the voltage at the source of MN2 is the same as the voltage at the source of MN1. In this manner, instead of using the amplifier U1, the C-V converter 505 uses a current mirror to force the voltage value of $V_M$ to ground.

In one embodiment, the resistor R4 and transistor MN2 may be adjustable to accommodate different supply voltages. That is, by altering these values, the same circuit 500 may be used with different power supplies with different output voltages. However, even if R4 and MN2 are not adjustable, in some embodiments, it is possible to regulate different values of $V_{IN}$ using fixed values for R4 and MN2. That is, it has been found that even if R4 and MN2 are nonadjustable, the accuracy when using circuit 500 with different values of $V_{IN}$ is within 5% of using values of R4 and MN2 that are programmed for the specific $V_{IN}$. Thus, in one embodiment, the circuit 500 may be designed to be used with some average $V_{IN}$ value (e.g., −2.5V) but used with power supplies with different output voltages (e.g., −5V or −1V).

Figure 6:
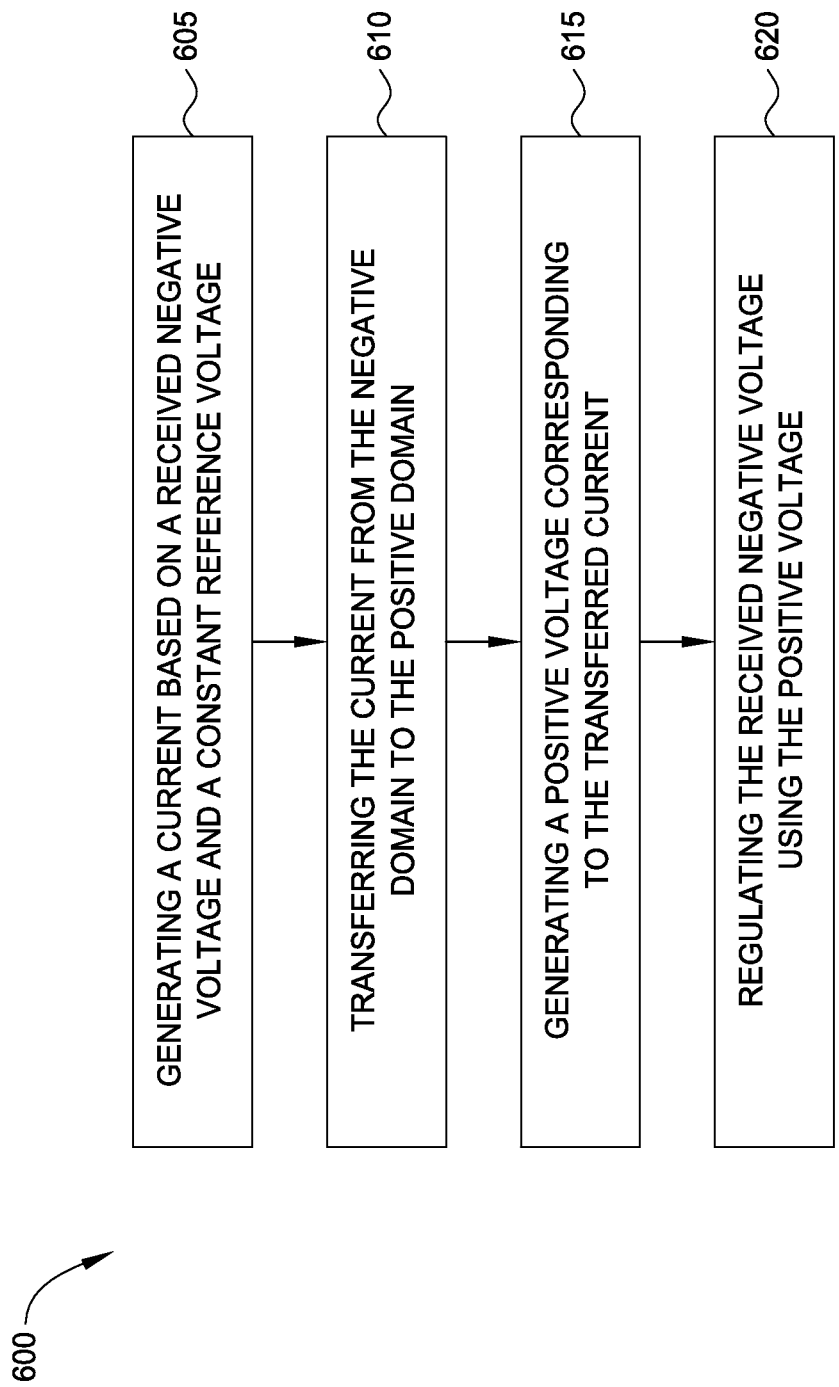
FIG. 6 illustrates a flow chart for regulating a negative voltage, according to one embodiment described herein.

FIG. 6 illustrates a flow chart 600 for regulating a negative voltage, according to one embodiment described herein. At block 605, a negative voltage converter generates a current based on a received negative voltage and a constant reference voltage. The received negative voltage may be an output of a power supply that is regulated by a voltage regulation system. To do so, the voltage regulation system detects changes in the received negative voltage from a desired output value and provides an error signal that the power supply uses to adjust the output voltage and minimize the detected change. The constant reference voltage may be any known voltage—e.g., a fixed negative, positive, or zero voltage.

At block 610, the negative voltage converter transfers the current from the negative voltage domain to the positive voltage domain. In one embodiment, this transfer occurs by conducting the current through a transistor where one node of the transistor is coupled to the positive voltage domain and another node is coupled to the negative voltage domain.

At block 615, the negative voltage converter converts the transferred current back into a voltage. However, because the current was transferred into the positive voltage domain, the voltage is now a positive voltage rather than a negative voltage. In one embodiment, the magnitudes of the received negative voltage and the positive voltage calculated at block 615 may be different. That is, the positive voltage may have been scaled (e.g., attenuated) during method 600 although this is not a requirement. The advantages of scaling the positive voltage in order to generate a linear transfer function were discussed above.

At block 620, the negative voltage converter passes the positive voltage to other components within the voltage regulation system (e.g., an error amplifier) which may compare the positive voltage to a positive reference voltage to generate the error signal. Based on this error signal, the power supply adjusts its output to the desired output voltage. Thus, as loads on the power supply vary or environmental conditions change, the voltage regulation system can detect and account for any errors in the negative output voltage of the power supply.

Conclusion

Various embodiments of the present technology provide input devices and methods for improving usability. For example, many input devices include power supplies that provide power to other circuits. The input devices may also include voltage regulation systems that monitor the output of the power supplies and adjust the output using a feedback loop. Embodiments described above describe regulating a negative voltage output from a power supply using a positive representation of the negative output voltage.

To convert a negative output voltage to a positive voltage, a negative voltage converter changes the negative voltage into a current. For example, the converter may include a current generator that outputs a current that corresponds to the negative voltage received from the power supply. This current is then transferred from the negative voltage domain to the positive voltage domain and is fed through a voltage generator which outputs a positive voltage corresponding to the current. By doing so, the negative voltage output is transformed into a corresponding positive voltage. This positive voltage may then be compared to a positive reference voltage to determine an error signal factor for adjusting the power supply.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A voltage conversion circuit comprising:
   a voltage-to-current converter configured to receive only a negative voltage in a negative domain as an input and output a current based on a difference between the negative voltage and a constant reference voltage;
   a converter configured to receive the output current from the voltage-to-current converter and convert the output current in the negative domain to a transferred current in a positive domain; and
   a current-to-voltage converter configured to generate a positive voltage in the positive domain that corresponds to the transferred current.

2. The circuit of claim 1, further comprising an error compensator coupled to an output of the current-to-voltage converter to receive the positive voltage, the error compensator configured to compare the positive voltage to a positive reference voltage to regulate a negative output voltage from a power supply.

3. The circuit of claim 1, wherein the voltage-to-current converter comprises an amplifier configured to provide the constant reference voltage based on an input reference voltage.

4. The circuit of claim 3, wherein the voltage-to-current converter comprises a field-effect transistor in a feedback loop of the amplifier, wherein a source of the field-effect transistor provides the constant reference voltage and a gate of the field-effect transistor is coupled to an output of the amplifier.

5. The circuit of claim 1, wherein the constant reference voltage is substantially equal to a system ground, wherein the converter comprises a current mirror including at least two transistors, wherein the current mirror is configured such that a shared gate voltage of the at least two transistors is driven to a value that results in a source of one of the at least two transistors to output the system ground as the constant reference voltage.

6. The circuit of claim 1, wherein the converter comprises a current mirror including at least two transistors, wherein a shared gate voltage whose value is determined by the output current is used by the current mirror to generate the transferred current.

7. The circuit of claim 6, wherein electrical characteristics of the at least two transistors are selected such that the current mirror is configured to attenuate the output current when generating the transferred current.

8. The circuit of claim 6, wherein at least one of the at least two transistors is programmable to adapt the circuit to output corresponding positive voltages for different values of the negative voltage.

9. A method comprising:
  receiving only a negative voltage in a negative voltage domain at an input of a voltage-to-current converter;
  converting the negative voltage into a corresponding current using the voltage-to-current converter based on a difference between the negative voltage and a constant reference voltage;
  converting the corresponding current in the negative domain to a transferred current in a positive domain; and
  generating a positive voltage in the positive domain that corresponds to the transferred current.

10. The method of claim 9, further comprising:
  regulating a negative output voltage from a power supply using an error voltage determined by comparing the positive voltage to a positive reference voltage.

11. The method of claim 9, wherein converting the negative voltage into the corresponding current comprises:
  generating the constant reference voltage using an amplifier that receives an input reference voltage that controls a value of the constant reference voltage.

12. The method of claim 11, wherein converting the negative voltage into the corresponding current comprises:
  generating the constant reference voltage at a source of a field-effect transistor in a feedback loop of the amplifier, wherein a gate of the transistor is coupled to an output of the amplifier.

13. The method of claim 9, wherein the constant reference voltage is substantially equal to a system ground, wherein a current mirror including at least two transistors is configured such that a shared gate voltage of the at least two transistors is driven to a value that results in a source of one of the at least two transistors to output the system ground as the constant reference voltage.

14. The method of claim 9, wherein converting the corresponding current to the transferred current in the positive domain comprises:
  generating the transferred current using a shared gate voltage of at least two transistors forming a current mirror, wherein a value of the shared gate voltage is set by the corresponding current.

15. The method of claim 14, further comprising:
  programming at least one of the at least two transistors to configure the current mirror based on different values of the negative voltage.

16. A processing system comprising:
  a voltage-to-current converter configured to receive a negative voltage in a negative domain as an input and output a current based on a difference between the negative voltage and a constant reference voltage;
  a converter configured to receive the output current from the voltage-to-current converter and convert the output current in the negative domain to a transferred current in a positive domain;
  a current-to-voltage converter configured to generate a positive voltage in the positive domain that corresponds to the transferred current; and
  an error compensator coupled to an output of the current-to-voltage converter to receive the positive voltage, the error compensator is configured to compare the positive voltage to a positive reference voltage to regulate a supply voltage in the processing system.

17. The processing system of claim 16, further comprising:
  a sensing module configured to control a plurality of sensor electrodes for performing capacitive sensing.

18. The processing system of claim 17, wherein the sensing module, voltage-to-current converter, converter, current-to-voltage converter, and error compensator are located on a single integrated circuit.

19. The processing system of claim 17, further comprising:
  a display module configured to control a plurality of display electrodes for updating a display.

20. The processing system of claim 19, wherein the sensing module, display module, voltage-to-current converter, converter, current-to-voltage converter, and error compensator are located on a single integrated circuit.

* * * * *